C. STANTON.
COMBINED TRANSMISSION AND GEAR SHIFTING DEVICE.
APPLICATION FILED AUG. 21, 1916.
1,236,225. Patented Aug. 7, 1917.
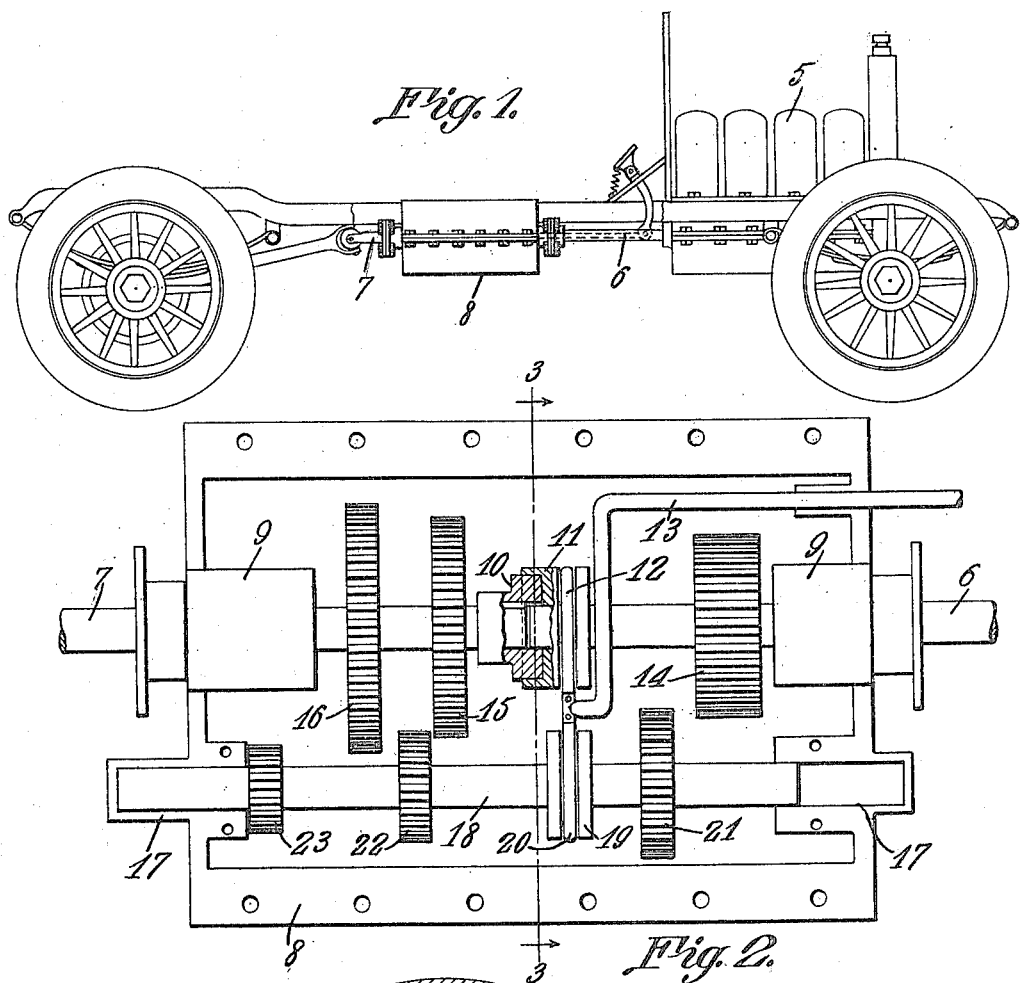
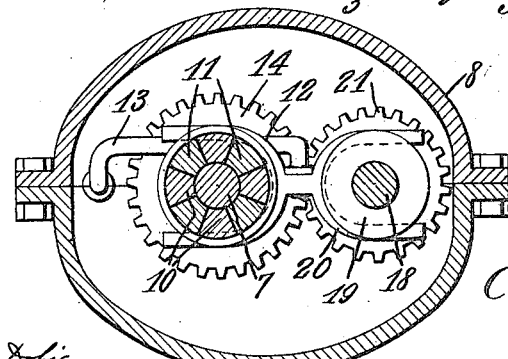

UNITED STATES PATENT OFFICE.

CHARLES STANTON, OF PENDLETON, OREGON.

COMBINED TRANSMISSION AND GEAR-SHIFTING DEVICE.

1,236,225.    Specification of Letters Patent.    Patented Aug. 7, 1917.

Application filed August 21, 1916. Serial No. 116,130.

*To all whom it may concern:*

Be it known that I, CHARLES STANTON, a citizen of the United States, residing at Pendleton, in the county of Umatilla and State of Oregon, have invented certain new and useful Improvements in Combined Transmission and Gear-Shifting Devices, of which the following is a specification.

This invention relates to combined speed changing and power transmission devices, and is adapted particularly for use in connection with motor vehicles.

The primary object of the invention is to provide an improved power transmission mechanism which can be operated readily by the vehicle driver to deliver variable speeds of rotation to the drive shaft.

A further object of the invention is to provide a gear mechanism which is constructed and arranged in such manner as to be capable of permitting power to be imparted at a low degree of speed to the power or drive shaft without accelerating the speed of the motor to cause racing and overheating of the same.

A still further object of the invention is to provide a combined speed changing and power transmission gearing which is of simple and inexpensive construction, which is featured by the lack of intricate and complicated parts, which obviates the use of separately sliding speed gears, which is simple and easy of operation, which requires no adjusting and obviates the use of springs and other tensioning devices, which is proof against accidental breakage, wear, and derangement, and which will prove highly efficient in practice.

With these objects in view, together with others which will appear as the description proceeds, the invention resides in the novel formation, combination, and arrangement of parts, all as will be described more fully hereinafter, illustrated in the drawings, and particularly pointed out in the claims.

The invention will be best understood by referring to the accompanying drawings, wherein:—

Figure 1 is a side elevation of a vehicle chassis equipped with a power transmission and speed change gearing constructed in accordance with the invention;

Fig. 2 is an enlarged fragmentary view of the gearing with a portion of the gear casing removed; and Fig. 3 is a sectional view taken upon line 3—3 of Fig. 2.

The present invention is illustrated as being used in connection with a motor car, and a vehicle of that type wherein there are but two speed changes, namely, low and high, and the invention in addition to forming an improved low speed connection, supplies an intermediate speed change. The device is adapted particularly for use in connection with Ford motor vehicles, but it is to be understood that the use of the invention is not necessarily restricted to vehicles of this make or type.

Referring more particularly to the drawings, the drive shaft which derives its power from the motor 5 is broken, and provides front and rear axially alined shaft sections 6 and 7 respectively, the former being operatively connected at its forward end to the engine, while the latter connects at its rear end with the propelling shaft. The broken ends of the drive shaft terminate in close proximity to each other, as shown in Fig. 2 of the drawings.

The adjacent ends of the sectional shaft are inclosed within a housing 8, the latter being of any approved construction, and the said housing provides bearing portions 9 having rollers or other suitable anti-friction devices therein for the support of the shaft ends.

The forward end of the rear section 7 of the shaft is equipped with a clutch head 10 the latter being fixed to the shaft extremity, while a sliding clutch head 11 is arranged upon the rear extremity of the forward section 6 of the drive shaft. This sliding clutch head is preferably keyed to the shaft section so as to rotate therewith. A shifting yoke 12 rides within a suitable groove in the clutch head 11, and to the said yoke is connected a shifting rod 13 leading to a lever arranged upon the vehicle within convenient reach of the driver thereof.

Fixedly secured upon the shaft section 6 adjacent the front end of the case 8 is a relatively wide gear 14, and fixed upon the forward end of the rear section 7 of the drive shaft and in spaced relation to each other are relatively narrow speed gears 15 and 16, the same being of different diameters.

A pair of elongated bearing portions 17 are formed in the gear case 8, within which a sliding shaft 18 is mounted, the said bearing portion supporting the extremities of the jack or countershaft 18 and maintaining the latter in spaced parallel relation to the drive shaft for the vehicle. The countershaft is equipped with a grooved hollow 19, which receives an outwardly projecting yoke 20, forming part of the yoke 12 for operating the slidable clutch head 11. The collar 19 is fixed to the shaft 18, and it is obvious that sliding movement delivered to the clutch head will cause the jack shaft 18 to slide within its bearings 17 longitudinally of the gear case.

Fixed upon the countershaft 18 and adjacent the forward end thereof, is a relatively narrow gear 21, the latter being adapted to intermesh with the gear 14 fixed to the drive shaft 6 and the said countershaft is also provided adjacent its rear end with fixed spaced relatively small speed gears 22 and 23, the same being adapted to intermesh at certain times with the gears 15 and 16 fixed to the drive shaft section 7.

With the shifting rod 13 in the position shown in Fig. 2 of the drawings, it will be observed that the sliding head 11 upon the shaft section 6 will be locked in engagement with the fixed clutch head on the section 7, whereby the said shaft sections are coupled so as to form a direct power connection between the engine or motor 5 and the power transmitting shaft at the rear of the vehicle. When in this position, the countershaft 18 is moved to the limit of its rearward extent, and the gears 21, 22, 23 are out of mesh with the gears upon the parallel driving shaft sections 6 and 7. The gears upon the countershaft are so positioned that immediately upon the sliding head 11 becoming released from the clutch head 10, the gears 21 and 22 upon the countershaft will become enmeshed with the gears 14 and 15 upon the driving shaft sections 6 and 7. The gears thus meshed form an intermediate speed, and further forward movement of the shifting rod 13 causes the countershaft 18 to move forwardly to such extent as to disengage the gear 22 from the gear 15 and to enmesh the smaller gear 23 with the largest of the gears 16. By reason of the fact that the gear 14 is relatively wide, the same operative connection between the said gear and the gear 21 is maintained in shifting from intermediate to low. With the parts in the position last mentioned, the driving connection will be from the shaft section 6 through the intermeshing gears 14—21 to shaft 18 and to the intermeshing gears 23—16 to the shaft section 7.

From this construction, it is apparent that I have provided an extremely simple and yet thoroughly efficient transmission and speed changing mechanism. It is obvious that low speed by the particular arrangement may be attained without the necessity of speeding up or racing the engine.

While the above is a description of the preferred embodiment of the invention, it is obvious that various changes in the minor details of construction and arrangement of parts, may be resorted to without departing from the spirit of the invention, or exceeding the scope of the claims.

What is claimed is:—

1. The combination with adjacent shaft ends, of gears on said ends, a countershaft, coöperating clutch members on said ends, gears on said shaft adapted to intermesh with the gears on said ends, a rod for moving said countershaft, and means governed by the movements of said rod for moving one of said clutch members, substantially as described.

2. The combination with adjacent shaft ends, of gears on said ends, a clutch head fixed on one of said ends, a clutch head slidably mounted upon the opposite end and adapted to move into and out of connection with the fixed head, a countershaft, gears on said countershaft adapted to intermesh with those on said ends, a rod for moving said sliding clutch head, and a connection between said rod and said countershaft whereby the latter will be moved, substantially as described.

3. The combination with adjacent shaft ends, of gears arranged upon said ends, a sliding clutch connection between said shaft ends, a countershaft, gears on said countershaft adapted upon sliding movement of said countershaft to move into or out of connection with the gears on said shaft ends, means for operating said clutch, and a connection between said means and said countershaft, whereby the countershaft gears will be disengaged from the shaft end gears when said clutch connects said shaft ends, substantially as described.

4. The combination with adjacent shaft ends, of gears arranged upon said ends, a clutch head fixed to one end of one of said shafts, a sliding head upon the adjacent end of the opposite end adapted to move into and out of engagement with said fixed head, a countershaft arranged parallel with said shaft ends and adapted to slide longitudinally thereof, gears fixed to said countershaft and adapted to intermesh with the gears on said shaft ends, a rod for shifting said sliding clutch head, a connection between said rod and said countershaft whereby movements of the former will slide the latter, and the said countershaft having its gears disengaged from those of said shaft ends when said clutch heads are engaged, substantially as described.

In testimony whereof I affix my signature in presence of two witnesses.

CHARLES STANTON.

Witnesses:
FLORA M. PEDRO,
CHARLES C. PETERSON.

Copies of this patent may be obtained for five cents each, by addressing the "Commissioner of Patents, Washington, D. C."